(12) United States Patent
Griffeth et al.

(10) Patent No.: US 12,108,754 B2
(45) Date of Patent: Oct. 8, 2024

(54) BUGLE TUBE WITH SCRAPER

(71) Applicants: Alan Griffeth, Syracuse, UT (US); Brad Griffeth, Syracuse, UT (US)

(72) Inventors: Alan Griffeth, Syracuse, UT (US); Brad Griffeth, Syracuse, UT (US)

(*) Notice: Subject to any disclaimer, the term of this patent is extended or adjusted under 35 U.S.C. 154(b) by 245 days.

(21) Appl. No.: 17/827,313

(22) Filed: May 27, 2022

(65) Prior Publication Data
US 2022/0378037 A1    Dec. 1, 2022

Related U.S. Application Data

(60) Provisional application No. 63/194,164, filed on May 27, 2021.

(51) Int. Cl.
    *A63H 5/00*    (2006.01)
    *A01M 31/00*   (2006.01)

(52) U.S. Cl.
    CPC .............. *A01M 31/004* (2013.01); *A63H 5/00* (2013.01)

(58) Field of Classification Search
    CPC .............................. A01M 31/004; A63H 5/00
    See application file for complete search history.

(56) References Cited

U.S. PATENT DOCUMENTS

| | | | | |
|---|---|---|---|---|
| 1,175,518 A * | 3/1916 | Hansen | ............... | A01M 31/004 446/209 |
| 4,551,112 A * | 11/1985 | Johnson | .............. | A01M 31/004 446/202 |
| 4,737,130 A * | 4/1988 | Mann | .................. | A01M 31/004 446/207 |
| 5,582,530 A * | 12/1996 | Ady | ..................... | A01M 31/004 446/209 |
| 6,527,614 B1 * | 3/2003 | Primos | ................ | A01M 31/004 446/207 |
| 6,878,867 B2 * | 4/2005 | Porath | ................. | A01M 31/004 446/209 |
| 7,011,564 B2 * | 3/2006 | Ady | ..................... | A01M 31/004 446/209 |
| 7,658,660 B1 * | 2/2010 | Drury | ................. | A01M 31/004 84/383 A |

* cited by examiner

*Primary Examiner* — John A Ricci
(74) *Attorney, Agent, or Firm* — Kunzler Bean & Adamson (57) ABSTRACT

Apparatuses, systems, and methods are disclosed for a bugle tube with an integrated scraper. An apparatus includes a baffle portion comprising a first baffle end comprising a first baffle aperture, a second baffle end comprising a second baffle aperture, and a baffle sidewall extending from the first baffle end to the second baffle end, the baffle sidewall having a plurality of protruding members located about the surface of the baffle sidewall. The apparatus includes a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end. The second baffle end is coupled to the second mouthpiece end to connect the baffle portion to the mouthpiece portion to form a tube from the first mouthpiece end to the first baffle end.

20 Claims, 5 Drawing Sheets

BUGLE TUBE WITH SCRAPER

CROSS-REFERENCES TO RELATED APPLICATIONS

This application claims the benefit of U.S. Provisional Patent Application No. 63/194,164 entitled "BUGLE TUBE WITH SCRAPER" and filed on May 27, 2021, for Alan Griffeth, et al., which is incorporated herein by reference.

FIELD

This invention relates to hunting lures and more particularly relates to a bugle tube with a scraper.

BACKGROUND

Game calls are used to lure or attract animals by mimicking animal noises. One example is a bugle tube that can be used to enhance or amplify a sound of a game call or to create different tones for the game call by blowing air through the tube.

SUMMARY

Apparatuses, systems, and methods are disclosed for a bugle tube with an integrated scraper. In one embodiment, an apparatus includes a baffle portion comprising a first baffle end comprising a first baffle aperture, a second baffle end comprising a second baffle aperture, and a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall. In one embodiment, the apparatus includes a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end. In one embodiment, the second baffle end is coupled to the second mouthpiece end to connect the baffle portion to the mouthpiece portion to form a tube from the first mouthpiece end to the first baffle end.

In one embodiment, a bugle tube includes a baffle portion comprising a first baffle end comprising a first baffle aperture, a second baffle end comprising a second baffle aperture, and a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall. In one embodiment, the bugle tube includes a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end. In one embodiment, the second baffle end is coupled to the second mouthpiece end to connect the baffle portion to the mouthpiece portion to form a tube from the first mouthpiece end to the first baffle end. In one embodiment, the bugle tube includes a cover that substantially covers the bugle tube, the cover comprising a zipper configured to tighten the cover around the bugle tube when the bugle tube is inserted into the cover.

In one embodiment, a method includes forming a baffle portion comprising a first baffle end comprising a first baffle aperture, a second baffle end comprising a second baffle aperture, and a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall. In one embodiment, the method includes forming a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end. In one embodiment, the method includes coupling the second baffle end to the second mouthpiece end to connect the baffle portion to the mouthpiece portion to form a tube from the first mouthpiece end to the first baffle end.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Apparatuses, systems, and methods are disclosed for a bugle tube with an integrated scraper. In one embodiment, an apparatus includes a baffle portion comprising a first baffle end comprising a first baffle aperture, a second baffle end comprising a second baffle aperture, and a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall. In one embodiment, the apparatus includes a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end. In one embodiment, the second baffle end is coupled to the second mouthpiece end to connect the baffle portion to the mouthpiece portion to form a tube from the first mouthpiece end to the first baffle end.

In one embodiment, the apparatus includes a handle portion comprising a first handle end comprising a first handle aperture, a second handle end comprising a second handle aperture, and a handle sidewall extending from the first handle end to the second handle end, the handle sidewall having a substantially cylindrical and hollow form. In one embodiment, the first handle end is coupled to the second baffle end and the second handle end is coupled to the second mouthpiece end to form a handle between the mouthpiece portion and the baffle portion.

In one embodiment, the handle portion comprises a plurality of ridges protruding from a surface of the handle sidewall and encompassing the handle sidewall to assist a user with gripping the handle portion.

In one embodiment, the plurality of protruding members are attached to a protrusion component that is selectively removeable from the surface of the baffle sidewall of the baffle portion.

In one embodiment, the plurality of protruding members are formed into the surface of the baffle sidewall of the baffle portion.

In one embodiment, the plurality of protruding members have pyramid-like shapes.

In one embodiment, the plurality of protruding members protrude from the surface of the baffle sidewall of the baffle portion at various lengths.

In one embodiment, the plurality of protruding members have varying sizes.

In one embodiment, the plurality of protruding members are made of a material that includes antler material.

In one embodiment, the baffle portion and the mouthpiece portion are formed together during manufacturing such that the second baffle end is fixed to the second mouthpiece end to form a unitary element.

In one embodiment, the baffle portion is selectively couplable to the mouthpiece portion by mechanical fastening means such that different baffle portions are interchangeable with different mouthpiece portions.

In one embodiment, the apparatus includes a tonal insert member that comprises a cylindrical sidewall that extends from the first baffle end and into a space defined by the baffle sidewall.

In one embodiment, the tonal insert member is selectively couplable to the first baffle end such that different tonal insert members may be interchangeable with the first baffle end.

In one embodiment, a bugle tube includes a baffle portion comprising a first baffle end comprising a first baffle aperture, a second baffle end comprising a second baffle aperture, and a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall. In one embodiment, the bugle tube includes a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end. In one embodiment, the second baffle end is coupled to the second mouthpiece end to connect the baffle portion to the mouthpiece portion to form a tube from the first mouthpiece end to the first baffle end. In one embodiment, the bugle tube includes a cover that substantially covers the bugle tube, the cover comprising a zipper configured to tighten the cover around the bugle tube when the bugle tube is inserted into the cover.

In one embodiment, the plurality of protruding members are attached to a protrusion component that is selectively removeable from the surface of the baffle sidewall of the baffle portion.

In one embodiment, the protrusion component comprises a sleeve that is selectively attached to the baffle sidewall using a stretch fit.

In one embodiment, the protrusion component comprises a wrap that is selectively attached to the baffle sidewall using means for securing the wrap around the baffle sidewall.

In one embodiment, the bugle tube includes a call member that is selectively insertable into the first mouthpiece end of the mouthpiece portion to generate a game call, the call member interchangeable with various call members for generating various game calls.

In one embodiment, the bugle tube includes a strap, the strap attachable to the baffle portion at a first strap end and the mouthpiece portion at a second strap end by attachment means.

In one embodiment, a method includes forming a baffle portion comprising a first baffle end comprising a first baffle aperture, a second baffle end comprising a second baffle aperture, and a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall. In one embodiment, the method includes forming a mouthpiece portion comprising a first mouthpiece end comprising a first mouthpiece aperture, a second mouthpiece end comprising a second mouthpiece aperture, and a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end. In one embodiment, the method includes coupling the second baffle end to the second mouthpiece end to connect the baffle portion to the mouthpiece portion to form a tube from the first mouthpiece end to the first baffle end.

Figure 1A:
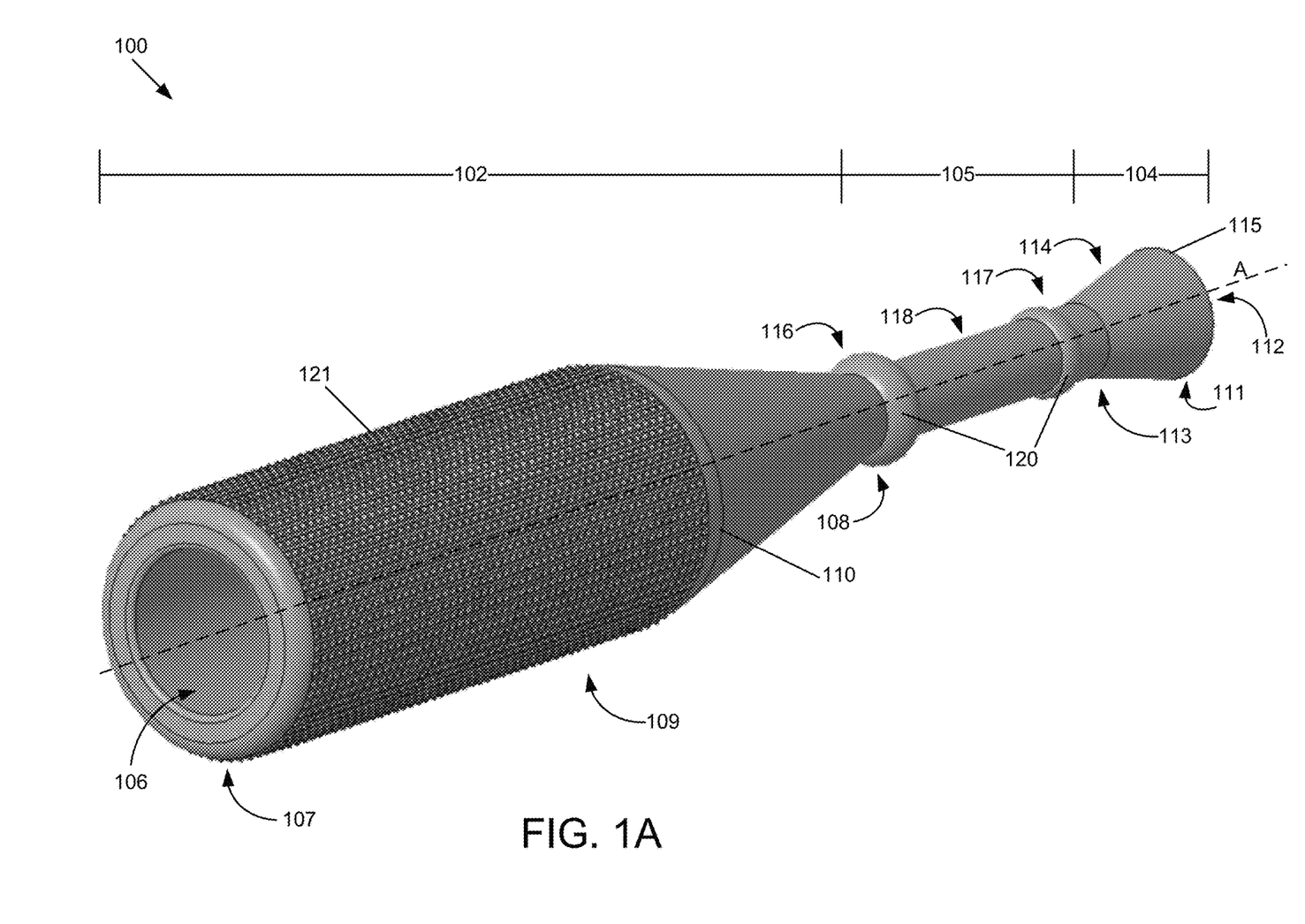
FIG. 1A is a perspective view illustrating one embodiment of a bugle tube with a scraper.

FIG. 1 depicts one embodiment of a bugle tube 100 with an integrated scraper. As used herein, a bugle tube may refer to hunting call or lure intended to enhance or amplify sounds to attract or lure animals such as big game like elk, moose, and deer. In one embodiment, a user places his mouth against the mouthpiece portion 104 and blows air through the substantially hollow bugle tube 100 to generate a sound that mimics an animal's call, e.g., an elk bugle sound that mimics an elk's bugle.

In one embodiment, the bugle tube 100 is comprised of a baffle portion 102, a handle portion 105, and a mouthpiece portion 104. In certain embodiments, the bugle tube 100 does not include a handle portion 105 and only includes the baffle portion 102 and the mouthpiece portion 104 where the mouthpiece portion 104 is coupled directly to the baffle portion 102.

In one embodiment, the baffle portion 102 includes a first baffle end 107, which includes a first baffle aperture 106, and a second baffle end 108, which includes a second baffle aperture (not shown). In one embodiment, the baffle portion 102 includes a baffle sidewall 109 that extends from the first baffle end 107 to the second baffle end 108. The baffle sidewall 109 is substantially cylindrical about an axis A and has a hollow form that tapers at a point 110 along the baffle sidewall 109 from the first baffle end 107 towards the second baffle end 108.

In one embodiment, the bugle tube 100 includes a mouthpiece portion 104 that includes a first mouthpiece end 111, which includes a first mouthpiece aperture 112, and a second mouthpiece end 113, which includes a second mouthpiece aperture (not shown). In one embodiment, the mouthpiece portion 104 includes a mouthpiece sidewall 114 that extends from the first mouthpiece end 111 to the second mouthpiece end 113. The mouthpiece sidewall 114 is substantially cylindrical about an axis A and has a hollow form that tapers at a point 115 along the mouthpiece sidewall 114 from the first mouthpiece end 111 towards the second mouthpiece end 113. In the depicted embodiment, for example, the taper point 115 for the mouthpiece is located at the first mouthpiece end 111 such that the entire mouthpiece portion 104 tapers from the first mouthpiece end 111 to the second mouthpiece end 113.

In one embodiment, the second baffle end 108 is coupled to the second mouthpiece end 113 to directly connect the baffle portion 102 to the mouthpiece portion 104 to form a tube, e.g., a bugle tube 100, from the first mouthpiece end 111 to the first baffle end 107.

In one embodiment, the bugle tube 100 includes a handle portion 105 that is located between the baffle portion 102 and the mouthpiece portion 104 and provides a section of the bugle tube 100 for the user to grab while using or carrying the bugle tube 100. In such an embodiment the handle portion 105 includes a first handle end 116, which includes a first handle aperture (not shown) a second handle end 117, which includes a second handle aperture (not shown), and a handle sidewall 118 extending from the first handle end 116 to the second handle end 117 and is substantially cylindrical about axis A and has a hollow form.

In one embodiment, the handle portion 105 forms part of the bugle tube 100 by coupling the first handle end 116 to the second baffle end 108 and the second handle end 117 to the second mouthpiece end 113 to form a handle between the mouthpiece portion 104 and the baffle portion 102. In one embodiment, the handle portion 105 includes a plurality of ridges 120 protruding from a surface of the handle sidewall 118 and encompassing the handle sidewall 118 to assist a user with gripping the handle portion 105.

In one embodiment, the baffle portion 102, the mouthpiece portion 104, and/or the handle portion 105 may be formed together during manufacturing such that the different components for a singular, unitary bugle tube 100. In other embodiments, the baffle portion 102, the mouthpiece portion 104, and/or the handle portion 105 are each separate components that are mechanically coupleable to one another, e.g., using a friction fit, a screw fit, a snap fit, a clip fit, and/or the like, such that different baffle portions 102, handle portions 105, and/or mouthpiece portions 104 may be interchangeably used to create a bugle tube 100.

For example, a bugle tube 100 may only include a baffle portion 102 and a mouthpiece portion 104, omitting the handle portion 105, to possibly create a shorter bugle tube 100. Or the baffle portion 102 may be interchanged or swapped out to include a baffle portion 102 with different protrusion members 121 (described below), a baffle portion 102 that creates a different tone or sound, and/or the like. In this manner, the bugle tube 100 and different portions 102, 104, 105, may be modular so that a user can customize the bugle tube 100 for a particular application, according to different specifications, and/or the like.

In one embodiment, the baffle sidewall 109 includes a plurality of protruding members 121 located about the surface of the baffle sidewall 109. In one embodiment, the protruding members 121 stick out or protrude away from the baffle sidewall 109 for scraping against trees, rocks, shrubs, or other environmental features to mimic the rattling and scraping of an animal's antlers or horns, e.g., scraping or rubbing against a tree to lure or attract the animal.

In one embodiment, the protruding members 121 may be shaped triangularly or as a pyramid such that each protruding member has a point or tip. Other shapes may be envisioned including squares/cubes, circles/spheres, and/or the like. In one embodiment, the plurality of protruding members 121 may include protrusions of various shapes.

In one embodiment, the protruding members 121 may be formed at different heights, or, in other words, may protrude from the surface of the baffle sidewall 109 at various lengths, such that adjacent protruding members 121 do not protrude from the baffle sidewall 109 at the same length, e.g., a protruding member 121 may protrude one millimeter from the baffle sidewall 109 and an adjacent protruding member 121 may protrude 2 millimeters from the baffle sidewall 109, or the like.

In one embodiment, the heights of the protruding members 121 may be randomly determined, within a predefined range (e.g., 1-5 millimeters) during forming, manufacturing, or production. Similarly, the protruding members 121 may be of various sizes or widths. For example, the base of a protruding member 121 shaped as a pyramid may be 0.5 mm by 0.5 mm, 1 mm by 1 mm, or the like. There may be numerous rows and columns of the protruding members 121, based on the shapes and sizes of the protruding members 121.

In one embodiment, the protruding members 121 are formed as part of the baffle portion 102, e.g., formed using the same material as part of a manufacturing or forming process. In other embodiments, the protruding members 121 may be made, produced, manufactured, or formed of different material than the material used to form the other parts of the baffle portion 102. For instance, if the bugle tube 100 is formed of plastic, the protruding members 121 may comprise aluminum, wood, or the like. In one embodiment, the protruding members 121 include or are comprised of antler to create a realistic antler rubbing or scraping sound when rubbed against a surface.

In one embodiment, the plurality of protruding members 121 may be attached to a protrusion component that is selectively removeable from the surface of the baffle sidewall 109 of the baffle portion 102. For instance, the plurality of protruding members 121 may be attached to a sleeve that is pulled over the baffle sidewall 109 and is secured with an elastic fit, a stretch fit, an adhesive, and/or other securing means. In another embodiment, the plurality of protruding members 121 may be attached to a wrap that is wrapped around the baffle sidewall 109 and secured using a hook-and-loop fastener, an adhesive, and/or other securing means. In this manner, the protrusion component comprising the plurality of protruding members 121 may be easily interchanged, removed, swapped, replaced or the like with a different protrusion component.

In one embodiment, the baffle portion 102 may have various lengths, diameters, thicknesses, and/or the like depending on the type of sound that the user wants to generate from the bugle tube 100 and/or from the protruding members 121 while the bugle tube is scraped against a surface. In certain embodiments, the baffle portion 102 may include insulation within the baffle sidewall 109 for creating different sounds from the bugle tube 100, for deadening the sound produced while scraping the protruding elements 109 against a surface, and/or the like.

In some embodiments, a tonal insert member may be included that comprises a cylindrical sidewall, about axis A, which extends from the first baffle end 107 and into a space defined by the baffle sidewall 109. In one embodiment, the tonal insert member is selectively couplable to the first baffle end 107 such that different tonal insert members may be interchangeable with the first baffle end 107.

For instance, different tonal insert members may be inserted into the first baffle end 107 to create different sounds, effects, or the like. The tonal insert members may attach to the first baffle end 107 using a screw fit, a friction fit, a snap fit, and/or the like. Instead of, or in addition to tonal insert members, the first baffle end 107 may be formed during production to create certain sounds or effects.

In one embodiment, the mouthpiece portion 104 is used by blowing air into first aperture 112 of the mouthpiece portion 104 and direct air through the bugle tube 100, e.g., through the handle portion 104 and/or the baffle portion 102, to create a sound from the first aperture 106 of the baffle portion 102 of the bugle tube 100. In one embodiment, the mouthpiece portion 104 may be interchangeable with different mouthpiece portions 104, e.g., using a screw fit, a snap fit, a friction fit, magnets, and/or the like to create different sounds, effects, or the like through the bugle tube 100. In certain embodiments, a call member may be inserted or otherwise attached to the first end 111 or the second end 113 of the mouthpiece portion 104 to generate different call sounds, e.g., a cow elk call, a bull elk call, a doe call, and/or the like. The call member may be selectively interchangeable with other call members.

In one embodiment, the bugle tube 100 is made of a rigid plastic material that is formed using thermoforming, injection molding, and/or the like. In certain embodiments, the bugle tube 100 is made of metal (e.g., aluminum), wood, antler material, and/or the like. In one embodiment, the overall length of the bugle tube 100 is about 22 inches long. The first baffle aperture 106 of the baffle portion 102 may be 4½ inches in diameter at the widest part. In certain embodiments, the first mouthpiece aperture 112 of the mouthpiece portion 104 is about 1% inches in diameter.

In one embodiment, the bugle tube 100 may include loops, holes, openings, tabs, rings, or the like (not shown) for attaching a strap for carrying the bugle tube 100. For instance, the baffle portion 102 may include a first strap end and the mouthpiece portion 104 may include a second strap end for connecting a strap to the bugle tube 100. In further embodiments, a cover for the bugle tube 100 may substantially cover the bugle tube 100, e.g., may be made of a material that forms to the shape of the bugle tube 100 (such as neoprene) that includes a zipper or other securing means for tightening and securing the cover around the bugle tube 100 when the bugle tube 100 is inserted into the cover.

Figure 1B:
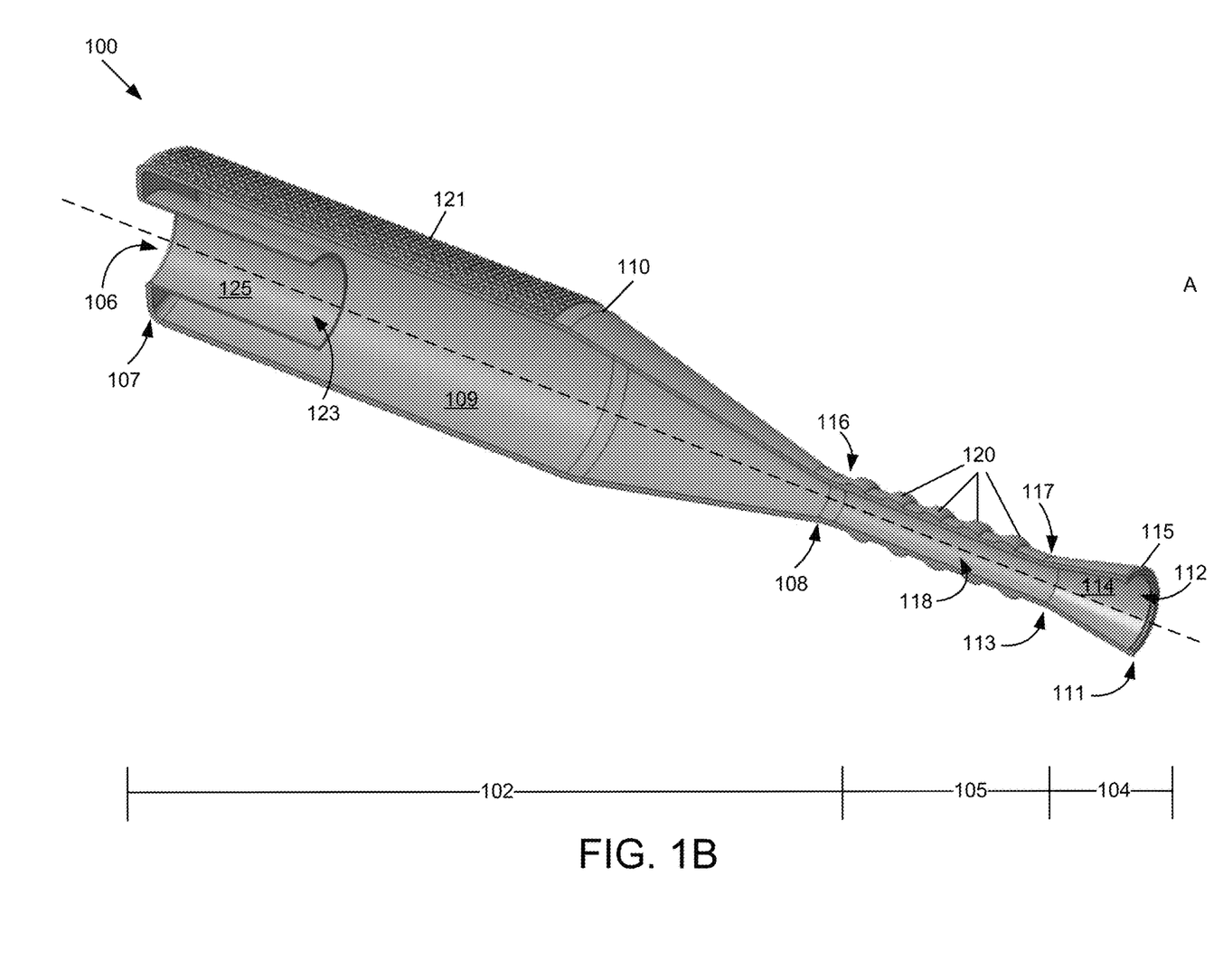
FIG. 1B is a cutout view further illustrating the bugle tube with a scraper of FIG. 1A.

FIG. 1B depicts a cutout view of the bugle tube 100 illustrated in FIG. 1A. As shown in FIG. 1B, a tonal insert member 123 includes a tonal sidewall 125 that extends into a space defined by the baffle sidewall 109 of the baffle portion 102 for creating a specific sound or sound effect when air travels from the mouthpiece portion 104 through the tonal insert member 123, and out the first baffle aperture 106 of the baffle portion 102. The tonal sidewall 125 of the tonal insert member 123 may have different lengths, different diameters, different textures, different thicknesses, and/or the like based on the sounds or sound effects that the user wants to produce. The tonal insert member 123 may be interchangeable with other tonal insert members 123 using a screw fit, friction fit, snap fit, and/or another connector to the first baffle end 107 of the baffle portion 102.

Figure 2A:
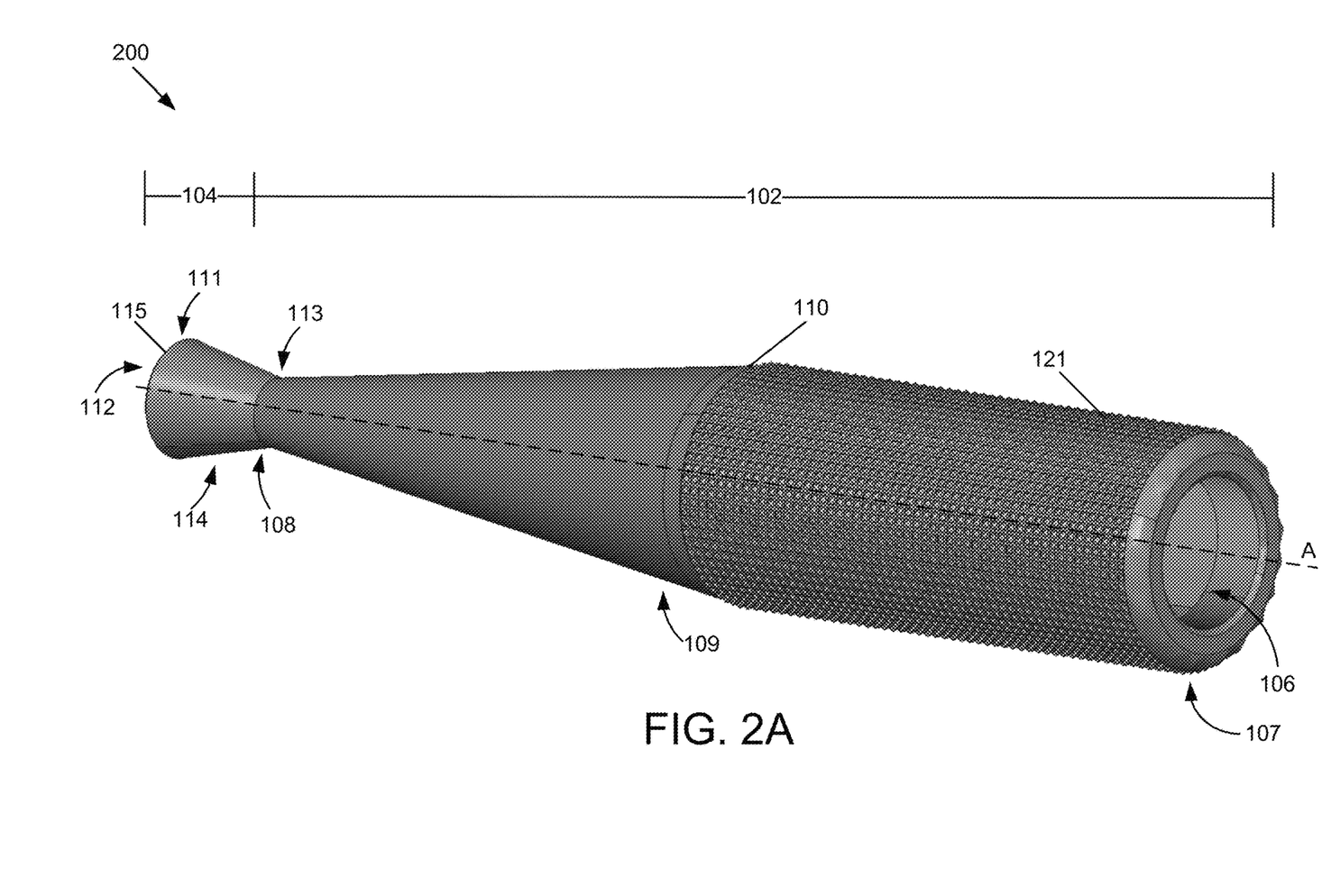
FIG. 2A is a perspective view illustrating another embodiment of a bugle tube with a scraper.

FIG. 2A depicts another embodiment of a bugle tube 200. The bugle tube 200 depicted in FIG. 2A may be substantially similar to the bugle tube 100 depicts and described above with reference to FIGS. 1A and 1B; however, the bugle tube 200 depicted in FIG. 2A is shown without a handle portion 105 such that the second end of 108 of the baffle portion 102 is coupled directly to the second end 113 of the mouthpiece portion 104. In such an embodiment, the size of the opening where the second end of 108 of the baffle portion 102 is coupled to the second end 113 of the mouthpiece portion 104 may be configured to create different sounds, tones, or the like from the bugle tube 200 when a user blows air through the bugle tube 200.

Figure 2B:
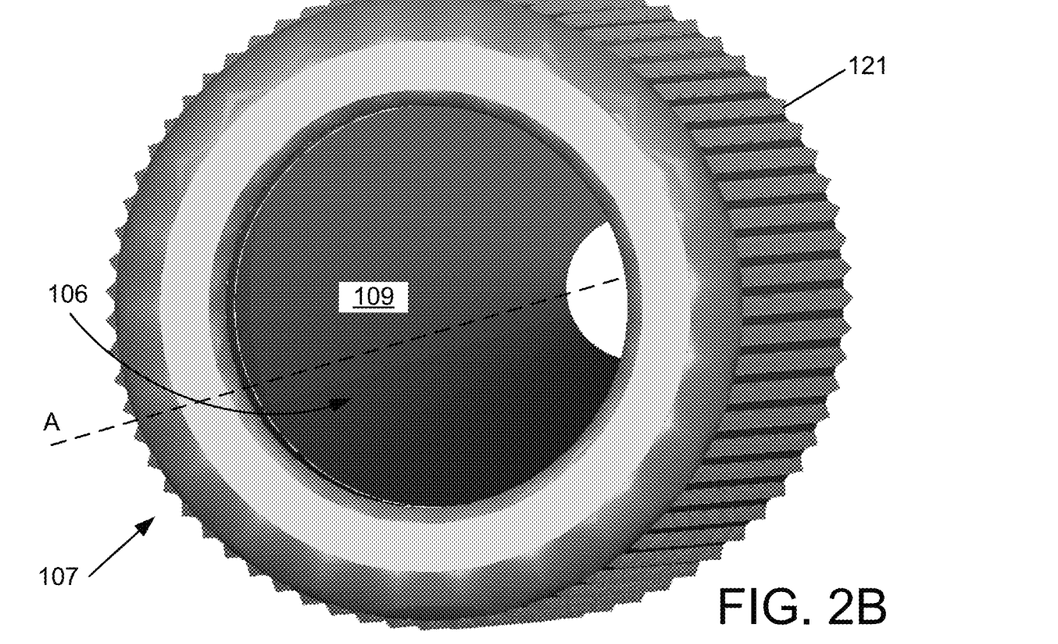
FIG. 2B is a perspective view further illustrating the bugle tube with a scraper of FIG. 2A.

FIG. 2B depicts a perspective view of the first end 107 of the baffle portion 102 of either of the bugle tubes 100, 200 depicted in FIGS. 1A and 2A.

Figure 2C:
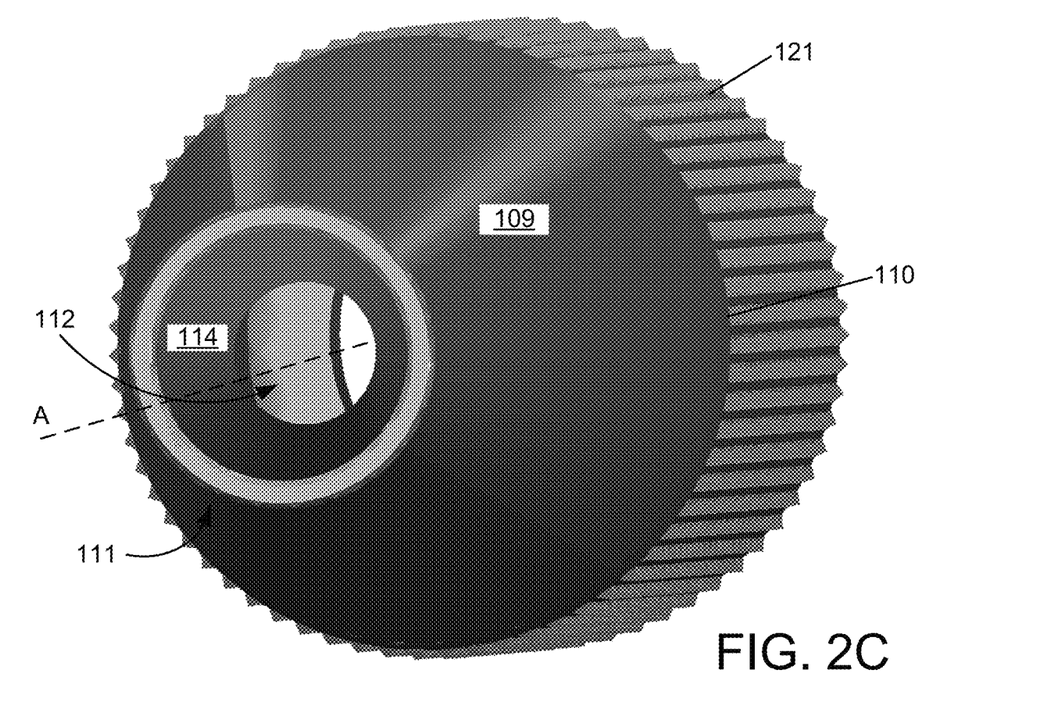
FIG. 2C is a perspective view further illustrating the bugle tube with a scraper of FIG. 2A.

FIG. 2C depicts a perspective view of the first end 111 of the mouthpiece portion 104 of either of the bugle tubes 100, 200 depicted in FIGS. 1A and 2A.

As shown in FIGS. 2B and 2C, the protruding members 121, in one embodiment, are located on the outer surface of the baffle sidewall 109 and completely covers and encircles the outer surface of the baffle sidewall 109 from the first baffle end 107 up to the taper point 110. In other embodiments, the protruding members 121 may be arranged or positioned in various configurations, e.g., with spaces between rows of protruding members 121, with spaces between protruding members 121 on the same row, in a completely random configuration, and/or the like.

Figure 3:
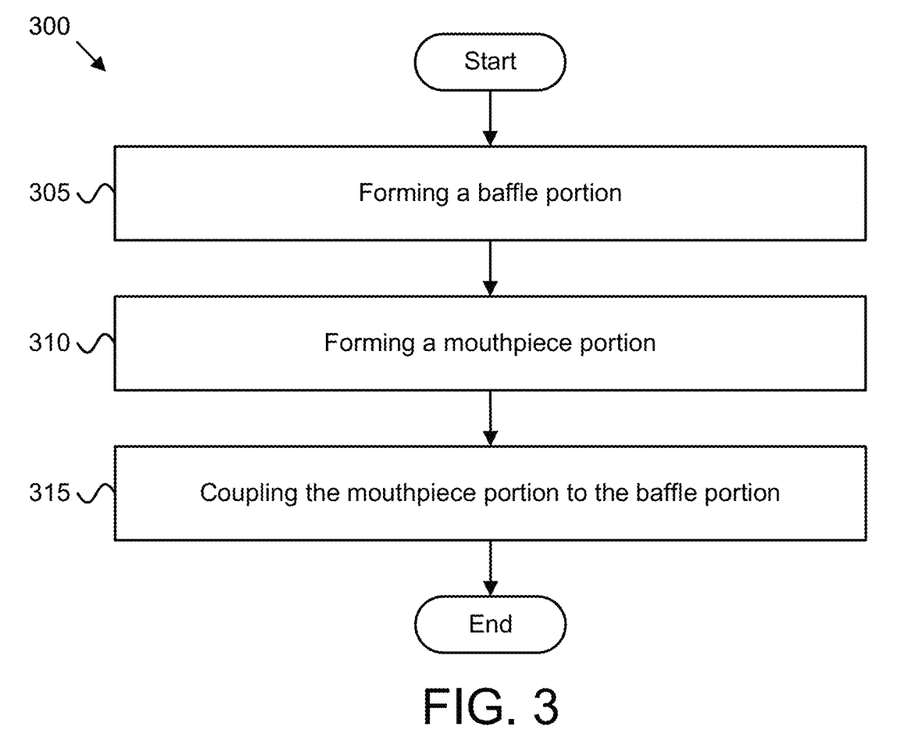
FIG. 3 is a schematic flow chart diagram illustrating one embodiment of a method for manufacturing a bugle tube with a scraper.

FIG. 3 depicts a schematic flow chart diagram illustrating one embodiment of a method 300 for a manufacturing a bugle tube, described above. In one embodiment, the method 300 begins and forms 305 a baffle portion comprising a first baffle end, a second baffle end, and a baffle sidewall extending from the first baffle end to the second baffle end, having a substantially cylindrical and hollow form, and tapering at a point along the baffle sidewall towards the second baffle end.

In one embodiment, the method 300 forms 310 a mouthpiece portion comprising a first a first mouthpiece end, a second mouthpiece end, and a mouthpiece sidewall extending from the first mouthpiece end to the second mouthpiece end, having a substantially cylindrical and hollow form, and tapering at a point along the mouthpiece sidewall towards the second mouthpiece end.

In one embodiment, the method 300 couples 315 the second baffle end to the second mouthpiece end to connect the baffle portion to the mouthpiece portion to form a tube from the first mouthpiece end to the first baffle end, and the method 300 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. An apparatus, comprising:
a baffle portion comprising:
   a first baffle end comprising a first baffle aperture;
   a second baffle end comprising a second baffle aperture; and
   a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall; and
a mouthpiece portion comprising:
   a first mouthpiece end comprising a first mouthpiece aperture;
   a second mouthpiece end comprising a second mouthpiece aperture; and
   a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end,
wherein the second baffle end is coupled to the second mouthpiece end to connect the baffle portion to the mouthpiece portion to form a tube from the first mouthpiece end to the first baffle end.

2. The apparatus of claim 1, further comprising a handle portion comprising:
a first handle end comprising a first handle aperture;
a second handle end comprising a second handle aperture; and
a handle sidewall extending from the first handle end to the second handle end, the handle sidewall having a substantially cylindrical and hollow form,
wherein the first handle end is coupled to the second baffle end and the second handle end is coupled to the second mouthpiece end to form a handle between the mouthpiece portion and the baffle portion.

3. The apparatus of claim 2, wherein the handle portion comprises a plurality of ridges protruding from a surface of the handle sidewall and encompassing the handle sidewall to assist a user with gripping the handle portion.

4. The apparatus of claim 1, wherein the plurality of protruding members are attached to a protrusion component that is selectively removeable from the surface of the baffle sidewall of the baffle portion.

5. The apparatus of claim 1, wherein the plurality of protruding members are formed into the surface of the baffle sidewall of the baffle portion.

6. The apparatus of claim 1, wherein the plurality of protruding members have pyramid-like shapes.

7. The apparatus of claim 1, wherein the plurality of protruding members protrude from the surface of the baffle sidewall of the baffle portion at various lengths.

8. The apparatus of claim 1, wherein the plurality of protruding members have varying sizes.

9. The apparatus of claim 1, wherein the plurality of protruding members are made of a material that includes antler material.

10. The apparatus of claim 1, wherein the baffle portion and the mouthpiece portion are formed together during manufacturing such that the second baffle end is fixed to the second mouthpiece end to form a unitary element.

11. The apparatus of claim 1, wherein the baffle portion is selectively couplable to the mouthpiece portion by mechanical fastening means such that different baffle portions are interchangeable with different mouthpiece portions.

12. The apparatus of claim 1, further comprising a tonal insert member that comprises a cylindrical sidewall that extends from the first baffle end and into a space defined by the baffle sidewall.

13. The apparatus of claim 12, wherein the tonal insert member is selectively couplable to the first baffle end such that different tonal insert members may be interchangeable with the first baffle end.

14. A bugle tube, comprising:
a baffle portion comprising:
a first baffle end comprising a first baffle aperture;
a second baffle end comprising a second baffle aperture; and
a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall;
a mouthpiece portion comprising:
a first mouthpiece end comprising a first mouthpiece aperture;
a second mouthpiece end comprising a second mouthpiece aperture; and
a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end,
wherein the second baffle end is coupled to the second mouthpiece end to connect the baffle portion to the mouthpiece portion to form a tube from the first mouthpiece end to the first baffle end; and
a handle portion comprising a first handle end and a second handle end, wherein the first handle end is coupled to the second baffle end and the second handle end is coupled to the second mouthpiece end to form a handle between the mouthpiece portion and the baffle portion.

15. The bugle tube of claim 14, wherein the plurality of protruding members are attached to a protrusion component that is selectively removeable from the surface of the baffle sidewall of the baffle portion.

16. The bugle tube of claim 15, wherein the protrusion component comprises a sleeve that is selectively attached to the baffle sidewall using a stretch fit.

17. The bugle tube of claim 15, wherein the protrusion component comprises a wrap that is selectively attached to the baffle sidewall using means for securing the wrap around the baffle sidewall.

18. The bugle tube of claim 14, further comprising a strap, the strap attachable to the baffle portion at a first strap end and the mouthpiece portion at a second strap end by attachment means.

19. The bugle tube of claim 14, wherein the plurality of protruding members have pyramid-like shapes.

20. A method, comprising:
forming a baffle portion comprising:
a first baffle end comprising a first baffle aperture;
a second baffle end comprising a second baffle aperture; and
a baffle sidewall extending from the first baffle end to the second baffle end, the baffle sidewall having a substantially cylindrical and hollow form, the baffle sidewall tapering at a point along the baffle sidewall towards the second baffle end, the baffle sidewall having a plurality of protruding members located about the surface of the baffle sidewall;
forming a mouthpiece portion comprising:
a first mouthpiece end comprising a first mouthpiece aperture;
a second mouthpiece end comprising a second mouthpiece aperture; and
a mouthpiece sidewall extending from the first mouthpiece end to the second mouthpiece end, the mouthpiece sidewall having a substantially cylindrical and hollow form, the mouthpiece sidewall tapering at a point along the mouthpiece sidewall towards the second mouthpiece end; and
coupling the second baffle end to the second mouthpiece end to connect the baffle portion to the mouthpiece portion to form a tube from the first mouthpiece end to the first baffle end.

\* \* \* \* \*